United States Patent [19]

Airhart

[11] Patent Number: 4,702,344
[45] Date of Patent: Oct. 27, 1987

[54] VENT MEANS FOR CLOSED AIR SYSTEM IMPACT-TYPE SEISMIC SOURCE

[75] Inventor: Tom P. Airhart, Plano, Tex.

[73] Assignee: Atlantic Richfield Company, Los Angeles, Calif.

[21] Appl. No.: 841,637

[22] Filed: Mar. 20, 1986

[51] Int. Cl.[4] ............................................. G01V 1/147
[52] U.S. Cl. .................................. 181/121; 181/117; 91/403
[58] Field of Search ............... 181/116, 117, 114, 113, 181/119, 121, 401; 367/189, 140, 190, 144; 91/403–409, 395, 1, 419; 417/510; 137/556

[56] References Cited

U.S. PATENT DOCUMENTS

| | | | |
|---|---|---|---|
| 1,557,957 | 10/1925 | Amrhein | 91/404 X |
| 2,080,760 | 5/1937 | Condon | 137/556 X |
| 3,288,244 | 11/1966 | Kirby | 181/119 |
| 3,296,941 | 1/1967 | Rochte | 91/404 |
| 4,147,228 | 4/1979 | Bouyoucos | 181/121 X |
| 4,284,164 | 8/1981 | Airhart et al. | 181/119 |
| 4,284,165 | 8/1981 | Airhart | 181/117 |
| 4,291,780 | 9/1981 | Fulkerson | 181/121 |
| 4,485,889 | 12/1984 | Bays | 181/401 X |

FOREIGN PATENT DOCUMENTS 2067289 7/1981 United Kingdom ................ 181/121

*Primary Examiner*—Donald P. Walsh
*Assistant Examiner*—Brian S. Steinberger
*Attorney, Agent, or Firm*—Robert M. Betz

[57] ABSTRACT

An impact-type surface seismic source utilizing a closed air system includes a heavy pistons supported above an earth contacting base plate partially within a hollow upstanding cylindrical housing, having a closed top and an open bottom. The housing side walls are provided with ports which communicate with a source of high pressure air. Preparatory to a firing operation, the piston blocks these ports, but upon a firing signal the piston is released and falls under gravity permitting high pressure air to enter the bore of the housing through the ports, thus driving the piston downwardly to strike the base plate. As the piston is retrieved and nears its original position, blocking the side ports, it mechanically actuates a valve so as to vent any air trapped above the piston within the housing bore. The vent remains open until the piston again falls.

3 Claims, 5 Drawing Figures

VENT MEANS FOR CLOSED AIR SYSTEM IMPACT-TYPE SEISMIC SOURCE

BACKGROUND OF THE INVENTION

1. Field of the Invention

This invention relates generally to the field of seismic prospecting and more particularly to an impact-type seismic source employing a repetitively cycled mass-piston powered by a closed air system.

2. Description of the Prior Art

U.S. Pat. No. 4,284,164 issued Aug. 18, 1981, to Tom P. Airhart entitled "Acoustic Pulse Generator" discloses apparatus for generating an acoustic pulse in a medium, the contents of which patent are hereby incorporated herein by reference. The apparatus includes an upstanding hollow cylindrical housing within which an impact piston is suspended. Upon issuance of a firing signal, the piston is driven downwardly by compressed air to strike a target plate positioned on the earth. The compressed air is provided by accumulators or the like which communicate with the bore of the housing near its upper end through ports in the housing sidewall. In its upper most position, the sidewall of the piston blocks these ports and is provided with piston rings which isolate the top of the piston from leakage of high pressure air. When the piston is displaced downwardly in a firing operation, it unblocks the pressure ports. High pressure from the accumulators is now exposed to the top of the piston and aids gravity in propelling it downwardly to strike the target plate. In the system described the top of the housing is provided with a vent communicating with the bore above the piston. The purpose of this vent is to provide an upward path for air escape during a firing operation so as to compensate for recoil force on the housing. Thus, the system is not a closed air system and the accumulators must be of large volume and periodically recharged.

In commonly assigned co-pending U.S. patent application, Ser. No. 455,172, filed Jan. 3, 1983, in the name of Andrew B. Woodrow, an impact-type seismic source similar in function to that described above is disclosed which, however, does employ a closed air system which is self-pressurizing between shots. In accordance with one embodiment of the modified apparatus of such application, the space in the housing above the piston is no longer constantly vented to atmosphere, but only when a valve is opened in a conduit leading into such space. As in the apparatus of U.S. Pat. No. 4,204,164, air enters the housing from the pressure vessels as the piston is driven downwardly during a firing operation. But in contrast to the patented apparatus, when the piston returns, air is repressurized into the pressure vessels at substantially the original pressure. In such a system, however, it is apparent that some means must be provided for relieving pressure build up in the thin air layer remaining above the piston once the pressure vessels are sealed off by blockage of the ports. Typically, the pressure vessels are charged to a value on the order of 300 p.s.i. Without some relief, the air trapped in the confined space above the piston between firings may easily be compressed to 700 or 800 p.s.i. If allowed to remain until the next firing of the piston this trapped pressure would impose a heavy strain on any support mechanism such as an electrical latch. But even without failure of such support mechanism, this trapped pressure could interfere with the intended firing cycle by changing the timing of the intended seismic impact in relation to an electrical firing signal. This would be particularly objectionable where multiple sources are to be fired simultaneously in order to enhance signal strenght.

While the external valve mechanism described in the referenced application relieves such trapped pressure, it has disadvantages. If it is solenoid operated, the solenoid may stick under certain weather conditions. Furthermore, any electrical system necessary in order to trigger the operation of such solenoid valves adds to complexity and increases risk of malfunction.

A conventional pressure activated relief valve at the top of the actuator housing might appear to eliminate the need for external electrical controls. However, this would be unworkable in the present system for several reasons. The relief valve would have to be set to open above the operating pressure of the actuator in order not to open prematurely during firing and thus degrade the strength of the downward thrust against the piston. However, upon return of the piston to its upper most position, such a relief valve would remain open only so long as such excess pressure were present within the space above the piston. In otherwords, some high pressure air would remain trapped in the bore of the actuator between firing with at least some of the undesirable results alluded to above. What is needed, therefore, is an improved valving arrangement which completely circumvents the possibility of any such pressure build up.

SUMMARY OF THE INVENTION

It is therefore, a general object of this invention to provide an improved impact-type seismic generator utilizing a closed air system with improved timing accuracy.

It is a more particular object of this invention to provide apparatus of the type described wherein undesirable air pressure build up between successive firings is avoided.

It is a still further object of this invention to provide an apparatus of the type described wherein the avoidance of undesirable pressure build up during successive firings is accomplished automatically by purely mechanical means.

Other objects and advantages of this invention will become evident from the detailed description to follow when rated in conjunction with the accompanying illustrative drawings.

The present invention contemplates an impact-type surface seismic source, which employs a heavy piston supported above an earth contacting target plate so that such piston extends slidably within an upstanding hollow cylindrical housing slidably within an upstanding hollow cylindrical housing having a closed top and open bottom. An air vent extends through the closed top into the bore in which the piston travels. This air vent is controlled by a valve which is biased to keep it closed when the apparatus is fired. In a firing operation, the piston is allowed to fall, exposing side ports in the bore of the housing through which high pressure air enters the space above the descending piston. The side ports communicate with a source of pressurized air through suitable air passages. After the piston is driven to the target, generating a seismic pulse, it is retrieved to its original support position, thereby repressurizing the source. Actuator means operatively interconnected with the valve projects in to the bore. Prior to reaching its original support position but after the side ports are blocked, the piston engages and displaces the actuator means so as to unseat the valve, allowing trapped air to escape through the air vent. The air vent remains open and the pressure above and below the piston is equalized until such time as the piston is again downwardly displaced in a firing operation allowing the valve once again to close the vent. In a more limited aspect, the valve comprises a movable disc oriented so that under spring bias it interrupts air flow through the vent. The actuating means is a stem fixed to such disc which extends axially into the bore so that its free end faces the piston. In an alternate embodiment of this apparatus, the disc is provided with a second stem extending oppositely to the actuating stem such that when the valve is actuated the end of thes second stem projects above the closed end of the housing.

DETAILED DESCRIPTION OF THE PREFERRED EMBODIMENTS

Figure 1:
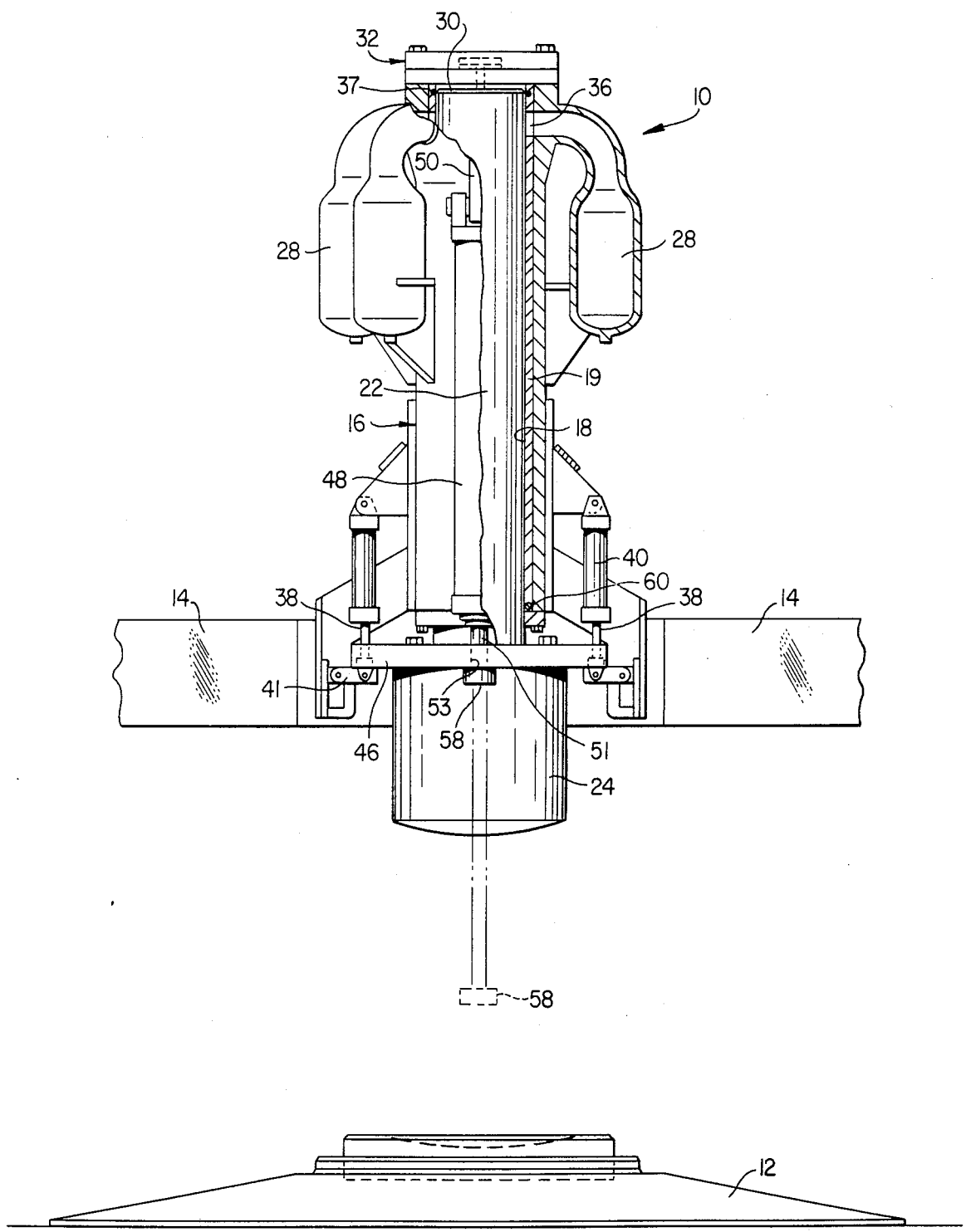
FIG. 1 is a simplified vertical elevational view, partly in section, of an apparatus in accordance with the preferred embodiment of this invention, showing the actuator piston in its upper most support position.

Referring now to FIG. 1, there is illustrated a seismic source comprising actuator 10 supported above base plate 12 in any suitable manner on frame 14 of a transport vehicle (not shown). Actuator 10 is an impact-type seismic device, which utilizes high pressure air to accelerate a mass to a target as generally described in U.S. Pat. No. 4,184,165, issued Aug. 18, 1981, to Tom P. Airhart, et al, and entitled "Acoustic Pulse Generator", the contents of which is hereby incorporated by reference. Actuator 10 consists generally of a hollow upstanding cylindrical housing 16 having a circular longitude bore 18 lined with bronze bushing 19. Bore 18 is adapted to receive the upper end of piston 22, the lower end of which enlarges in diameter beneath the lower open end of bore 18 to form an impact mass 24. The operation of actuator 10 causes mass 24 to be propelled rapidly downward by pressure provided from a plurality of pressure vessels 28 so as to strike base plate 12, which couples the attained kinetic energy of mass 24 into the earth as a seismic wave of acoustic frequency.

FIG. 1 shows piston 22 latched in its upper most or top position in which its top surface 30 is closely adjacent the closed upper end 32 of housing 16. In this position, piston 22 block ports 36 penetrating the sidewall of bore 18 and communiating with pressure vessels 28. Furthermore, in this position the top surface 30 of piston 22 engages hermetic ring seal 37, recessed within bushing 19 adjacent the upper end 32 above ports 36. The respective ends of piston rods 38 of a pair of trigger cylinders 40 supported on opposite sides of housing 16 are connected to hinged latches 41, which project beneath and support flange 46 of mass 24 in the uppermost position of piston 22. Piston 22 is also supported in its upper most position by means of hydraulic lift cylinders 48, which are affixed to opposite sides of housing 16 by means of mounting brackets 50. The piston rods 51 of cylinders 48 project slidably through vertical apertures 53 in flange 54, whose under surface is engageable by lift caps 58 affixed to the lower ends of rods 51.

Figure 2:
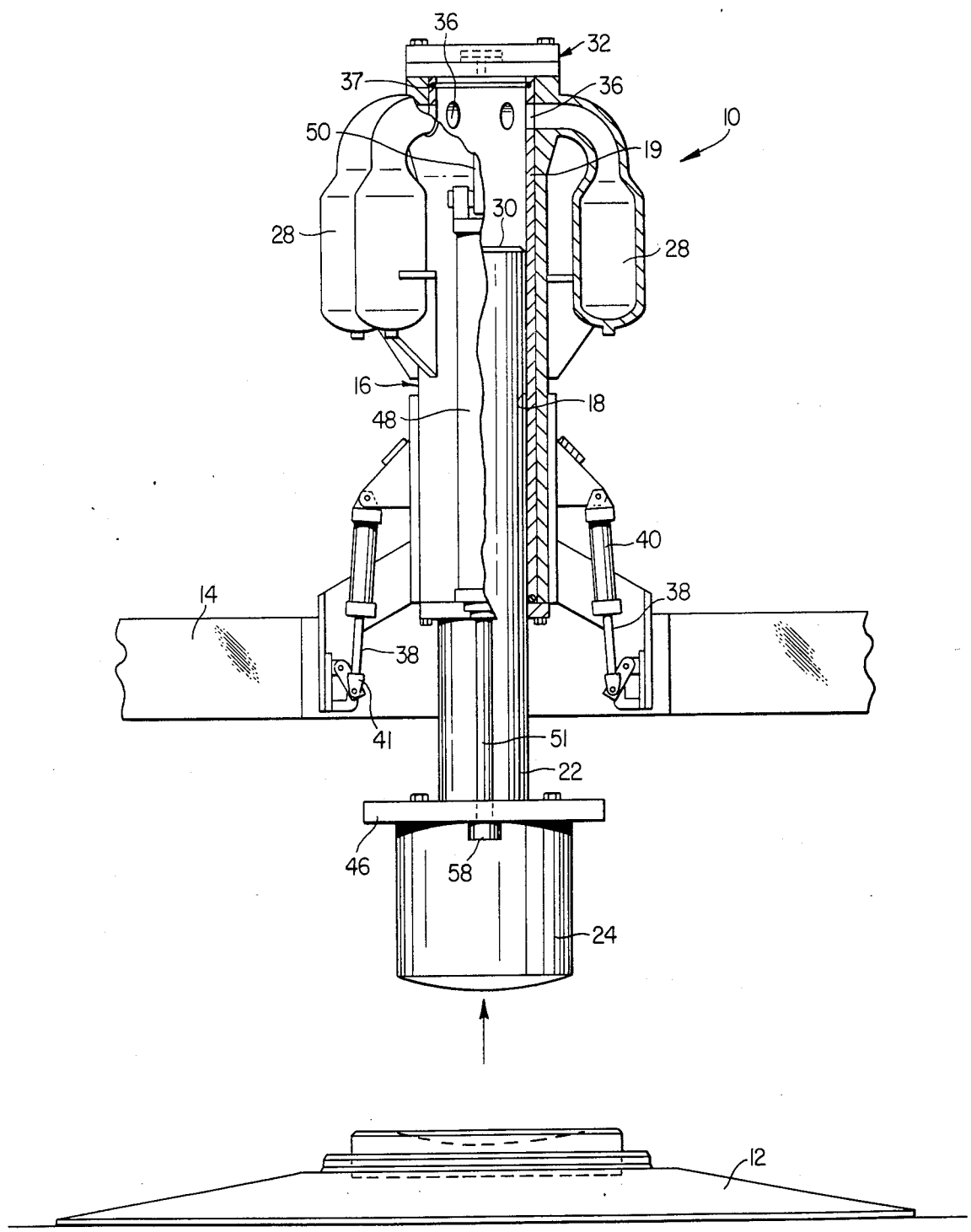
FIG. 2 is a further simplified elevational view in the apparatus of FIG. 1, showing the actuator piston in an intermediate position during its retrieval after being fired.

Preparatory to operation of actuator 10, rods 51 are lowered to assume the dotted position as shown in FIG. 1. When a firing signal is given, trigger cylinders 40 are activated so that their piston rods 38 extend downwardly and in so doing, swing hinged latches 41 away from under flange 46 as best seen in FIG. 2. As mass 24 drops under the force of gravity, high pressure air, typically on the order of 300 p.s.i., enters bore 18 through ports 36 and is exposed to top surface 30 of piston 22. This provides a powerful downward force across the entire cross-sectional area of top surface 30, which aids gravity so as to propel mass 24 into base plate 12 with great force. Upon completion of a firing operation, lift cylinders 48 are actuated to retract piston rod 51 causing caps 58 to move upwardly so as to engage the under surface of flange 46 and lift mass 24 to its original support position.

Since the side wall of piston 22 always makes contact with hermetic ring seal 60, positioned adjacent the bottom of housing 16, the air within actuator 10 is conserved. In this system, as piston 22 is drawn upwardly to its original top position, pressure vessels 28 are repressurized to substantially their original level. However, as soon as piston 22 has risen far enough so that its top surface 30 is above ports 36, a pressure build up occurs in the remaining space above piston 22. The invention is particularly concerned with the means for eliminating this pressure build up.

Figure 3:
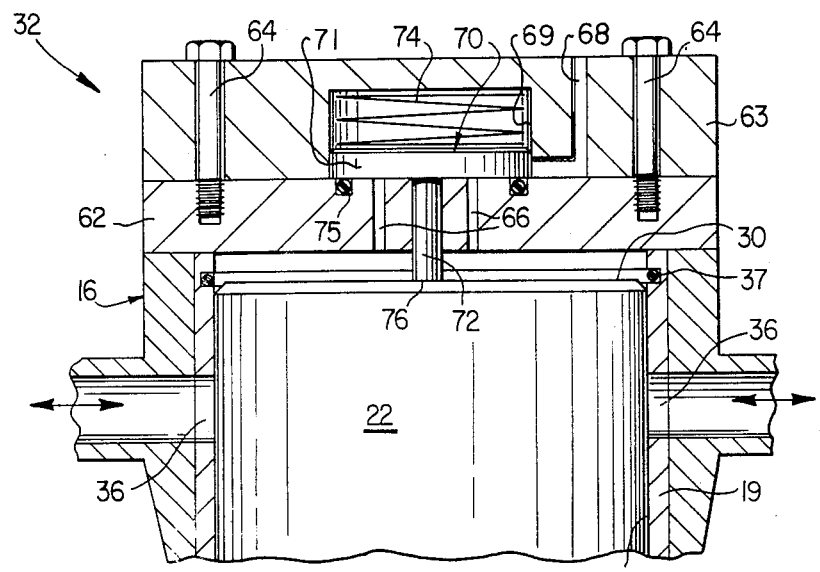
FIG. 3 is a detailed view in vertical section of the top of the housing of the apparatus shown in FIG. 1, showing of the actuator piston just prior to seating in its uppermost support position.
Figure 4:
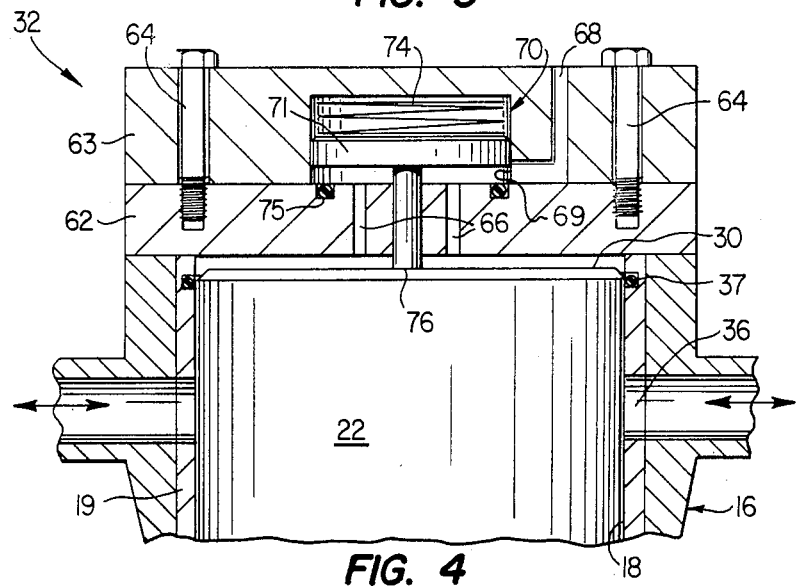
FIG. 4 is a further detailed view similar to that of FIG. 3 wherein the actuator piston is in its uppermost position.

With reference now to FIG. 3, upper end 32 of housing 16 is seen to consist of an innerplate 62 to which outer cover 63 is secured by bolts 64 or by other suitable means. A plurality of air vents 66 extend through inner plate 62 paralleling the axis of bore 18. A further air vent passage 68 extends from the outer surface of cover 63 into an inner valve cavity 69 communicating with vents 66. A valve 70 comprising disc 71 and stem 72 is movably disposed within plate 62 and cover 63 such that it controls the flow of air through vents 66 and 68. Disc 71 is biased by means of spring 74 so that it seats against seal 75 recessed in the top surface of inner plate 62, thereby blocking vents 66 and 68. In this position, stem 72 extends slidably through inner plate 62 so that its lower end 76 projects axially into bore 18. After a firing operation of actuator 10 occurs, piston 22 is drawn upwardly within bore 18 by operation of lift cylinders 48. After ports 36 are blocked top surface 30 engages end 76 of stem 72, pushing it upwardly against the bias of spring 74. When piston 22 reaches its upper most position as seen in FIG. 4, disc 71 is raised from its seat, allowing any high pressure air in bore 18 above top surface 30 to escape to atmosphere through vents 66 and 68. In this uppermost position, piston 22 has contacted and overlaps seal 37 which insures that there will be no further leakage of pressurized air above piston 22 from pressure vessels 28. The space above piston 22, typically about 0.1 inches in thickness, will now remain vented to atmosphere until piston 22 drops consequent to a further firing operation. In this way the pressure above and below piston 22 is equalized and operating pressure is unaffected. The axial distance within bore 18 between ports 36 and seal 37 is selected such that stem end 76 travels just far enough after ports 36 are blocked to insure positive opening of valve 70 while minimizing pressure build up. Spring 74 is, of course, of sufficient strength that it exceeds the upward force against disc 71 during operation, thus holding valve 70 closed. Since the pressure relief mechanism described involves a direct mechanical linkage between piston 22 and valve 70, the operation is highly reliable.

Figure 5:
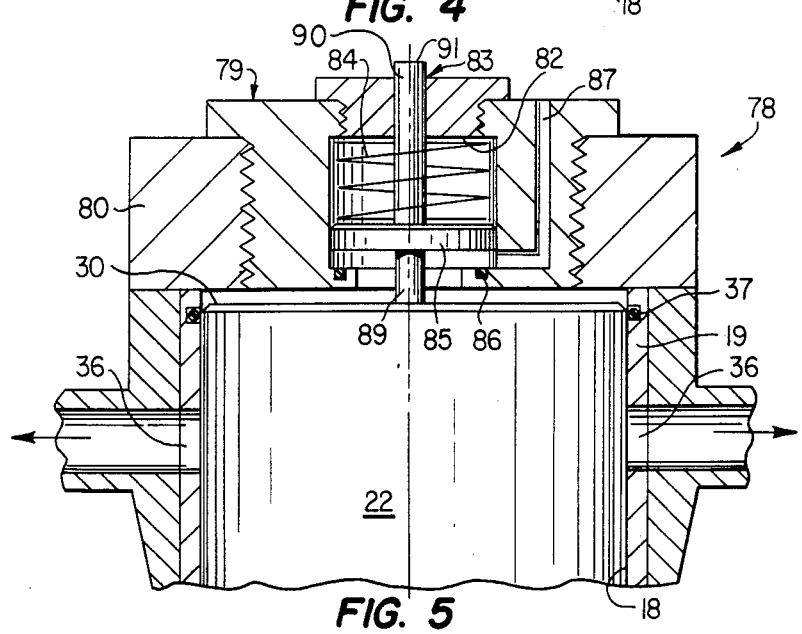
FIG. 5 is a detailed sectional view of the top of the actuator housing in accordance with an alternate embodiment of the invention.

FIG. 5 shows an alternate embodiment of this invention wherein housing 16 is provided with a modified upper end 78 comprising a valve assembly 79 threadably engaged wtih cover 80. Valve assembly 79 includes a central cavity 82 within which valve 83 is movable in an axial direction subject to the bias of spring 84. Valve 83 comprises a disc 85 adapted to seat against ring seal 86, thus blocking air passage from bore 18 into cavity 82, and from there, through vent 87 to atmosphere. Stem 89 is fixed to the underside of disc 85 and extends axially downwardly into bore 18, while a further stem 90 fixed to the upper surface of disc 85 extends slidably through the top of assembly 79. The operation of valve 83 is similar to that for the embodiment of FIG. 4, in that just prior to reaching the upper most position of piston 22, top surface 30 of piston 22 enages stem 89 urging disc 85 from its seat, as shown, and allowing air to escape through vent 87. At the same time, stem 90 is pushed upwardly so that its top end 91 extends above assembly 79. This provides a convenient visual indication of the condition of valve 83 in addition to the audible hiss of air escape through vent 87 verifying its operation. If desired, of course, a further refinement of the embodiment of FIG. 5 (not shown) could easily be devised in which the movement of stem 90 completes an electrical circuit signaling the condition of actuator 10. A still further variation of the invention described (not shown) can be practised wherein the actuating stem 72 is not physically attached to the valve disc 71. For example, a rod of appropriate length may be separately supported within end 32 of housing 16 for slidable movement in an axial direction. The length of the rod determines the piston position at which operation of valve 70 occurs.

It should be noted, finally, that many chages may be made in the combination and arrangement of elements as shown in the drawings as set forth in the specification without departing from the spirit and scope of the invention as set forth in the appended claims.

What is claimed is:

1. Apparatus for impacting a target comprising:
   (a) a hollow upstanding cylindrical housing having a closed upper end and open lower end and provided with a longitudinal bore, the housing being penetrated by a first and a second air passage opening into the bore and respectively penetrating a side wall of the housing and the closed end thereof;
   (b) a pressurized air supply vessel communicating with the bore through the first air passage, said second air passage being adapted to provide an escape path to atmosphere for the air in the bore;
   (c) piston means slidably interfitted with the bore for movement therein;
   (d) valve means for regulating air flow through the second air passage, such valve means being disposed within the housing so as to project within the bore and being biased so as to block such second air passage;
   (e) means for supporting the piston means in an upper most position in which piston means projects above and blocks the first air passage so as to isolate the air supply vessel from the bore and so as to engage the valve means in a manner to maintain the second air passage in an unblocked condition;
   (f) means for releasing the piston means such that the resultant gravity-induced movement thereof is accompanied in sequence by disengagement with the valve means and unblocking of the first air passage, thereby allowing pressurized air to enter the bore above the piston means and drive the piston means through the open lower end of the housing against the target; and
   (g) means for returning the piston means to such upper most position, the upward movement thereof being adapted to repressurize the air supply vessel through the first air passage and thereafter to expel through the second air passage the air confined in the bore between the piston means and the upper end of the housing.

2. Apparatus as claimed in claim 1 wherein the bore is provided with first hermetic seal means positioned below the first air passage in continual engagement with the piston means, thereby preventing air from escaping from the housing through the open lower end.

3. Apparatus as claimed in claim 2 wherein the bore is further provided with second hermetic seal means positioned above the first air passage and so as to engage the piston means in such upper most support position, the spacing between the first air passage and the second hermetic seal means being such that the piston means initiates engagement with the valve means prior to engagement with the second seal means.

* * * * *